United States Patent [19]

Fukuda et al.

[11] Patent Number: 4,709,368
[45] Date of Patent: Nov. 24, 1987

[54] SIDE-ARM PHASE-CONJUGATED LASER

[75] Inventors: Robert C. Fukuda, Alexandria; Suresh Chandra, Falls Church, both of Va.

[73] Assignee: The United States of America as represented by the Secretary of the Army, Washington, D.C.

[21] Appl. No.: 779,762

[22] Filed: Sep. 24, 1985

[51] Int. Cl.$^4$ .............................................. H01S 3/11
[52] U.S. Cl. ...................................... 372/10; 372/97; 372/99; 372/108; 372/27
[58] Field of Search ................... 372/9, 10, 97, 27, 98, 372/99, 108, 95, 103, 101

[56] References Cited
PUBLICATIONS

Chandra et al., "Sidearm Stimulated Scattering Phase--conjugated Laser Resonator", Opt. Lett., vol. 10, p. 356, Jul. '85.

Primary Examiner—Leon Scott, Jr.
Attorney, Agent, or Firm—Max L. Harwell; Aubrey J. Dunn; Anthony T. Lane

[57] ABSTRACT

A phase-conjugated Q-switched laser resonator. The resonator contains a laser active material and a polarizer/quarter-wave plate combination in a starter cavity. The polarizer optically couples one plane of polarization of laser radiation into a side arm containing a self-switching stimulated scattering phase-conjugate mirror.

2 Claims, 1 Drawing Figure

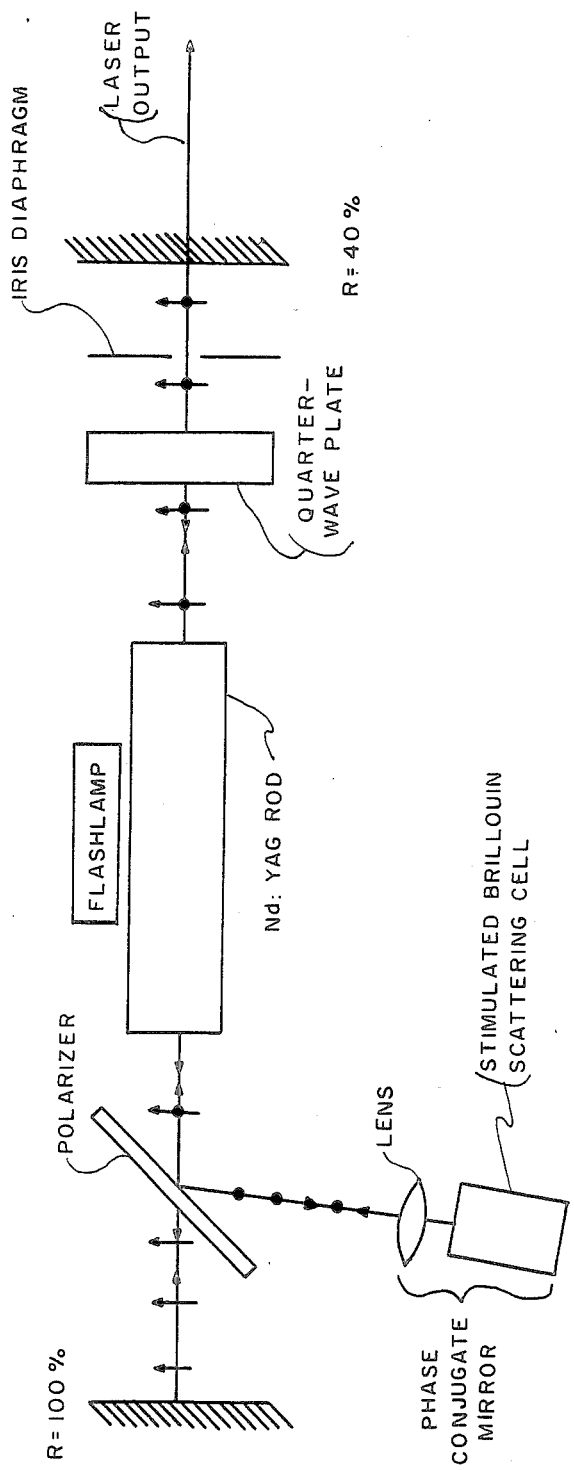

SIDE-ARM PHASE-CONJUGATED LASER

The invention described herein may be manufactured, used, and licensed by the U.S. Government for governmental purposes without the payment of any royalties thereon.

BACKGROUND OF THE INVENTION

This invention is in the field of phase conjugated laser resonators. Since the discovery of the optical phase conjugated reflection properties of stimulated Brillouin scattering (SBS), there has been considerable interest in the use of phase conjugation (PC) to enhance the performance of pulsed laser resonators. In such an application the rear mirror of a conventional laser resonator is replaced by a phase conjugate mirror (PCM) consisting of a lens-SBS cell combination. Since high light intensities are required to reach the SBS threshold for switching on the PCM, one incorporates the PCM inside a conventional (starter) laser cavity. However, this incorporation poses two problems. First, the required introduction of lens(es) inside the starter cavity makes laser alignment more complex since the lens (in the case of a single lens) must be precisely positioned with respect to the rear starter cavity mirror and, in the case of two or more lenses, with respect to each other as well as to said mirror, in order to preserve intracavity beam collimation. Second, the output wavefront is degraded by intracavity distortions which occur prior to switching on the PCM. This happens because the starter cavity provides the necessary threshold intensity for switching on the PCM, and accumulated wavefront distortions caused by the PCM components occur before the PCM turns on. We avoid these problems in our novel PC resonator by placing the PCM in an optically-coupled side arm.

SUMMARY OF THE INVENTION

The invention is a novel PC resonator design, in which a PCM is placed in a side arm optically coupled to a starter cavity. A polarizer/quarter wave plate combination is used to reflect most of the radiation from the starter cavity to the side arm. The Q of the resonator stays low until the SBS threshold is reached. At this point, the PCM switches on to reflect the laser radiation back on itself. This leads to a higher Q value for the resonator and a Q-switched pulse is generated. The output wavefront is not degraded by intracavity distortions which occur prior to switching on the PCM. This happens because the starter cavity, by itself, does not provide the necessary threshold intensity for switching on the PCM. Since no PCM components are in the starter cavity, its alignment is relatively easy. Therefore, the PCM components do not introduce wavefront distortions either before or after the PCM switches on.

BRIEF DESCRIPTION OF THE DRAWINGS

The single drawing FIGURE is a schematic showing of the invention.

DESCRIPTION OF PREFERRED EMBODIMENT

The invention may be best understood when this description is taken in conjunction with the drawing. In the particular embodiment which we made, we used a Nd:YAG anti-reflection coated rod as our laser material, pumped by a flashlamp, with a 100% reflectivity (R) mirror of 3 meter radius of curvature, and a 40% reflectivity flat mirror. These mirrors define the starter cavity for the laser. In order to allow PC to occur, we introduce the combination of a thin-film polarizer and a quarter-wave plate into the starter cavity. This combination diverts one plane of polarization of the radiation in the starter cavity into a side arm. Two polarization planes are schematically shown on the drawing, one by arrows, and the other by dots. The quarterwave plate may be rotated to keep the Q of the starter cavity at a suitable low value. We added an iris diaphragm to improve output beam characteristics; without it, we saw considerable pulse-to-pulse variations in the energy output, with many traverse modes and with a large beam divergence. The output beam with iris was essentially diffraction limited.

The side arm contains a PCM consisting of a lens and a SBS cell. This cell is a standard spectrophotometer cell containing cyclohexane or carbon disulfide liquids as the SBS medium.

We believe that operation of the invention occurs as follows: when the rod is pumped, a weak laser oscillation initially occurs in the low Q-starter cavity. Eventually, the SBS threshold is reached, the PCM switches on, resulting in a Q-switched output pulse.

The particular rod which we used was of 6 mm diameter and 75 mm length, and was placed in a Kigre pump cavity. The PCM lens had a 5 cm focal length. The iris diaphragm was adjusted for a 2.5 mm aperture, and was positioned in a 80 cm long starter cavity. With these specific components, we obtained 200 mJ of Q-switched laser output.

Although we have given specific examples of components and measurements, it should be understood that these are merely typical examples, within the scope of the invention. Other examples should be obvious to ones skilled in the art—specifically, the starter cavity could be any stable or unstable laser cavity; a lasing material other than Nd:YAG may be used and may yield a different wavelength output and power.

Moreover, although we believe that SBS is the dominant phenomenon by which the PC occurs, other stimulated scattering phenomona such as stimulated Rayleigh scattering could be occurring during operation of the invention.

We claim:

1. A phase-conjugated Q-switched laser including:
   a starter cavity defined by opposed reflectors;
   a laser active material in said starter cavity;
   a pump for said laser active material;
   a side-arm containing a phase conjugate mirror consisting of a lens and a stimulated Brillouin scattering cell;
   means for optically coupling said starter cavity to said side-arm and including a quarterwave plate and a polarizer in said starter cavity, wherein said cell acts as a Q-switch by undergoing stimulated Brillouin scattering when the laser active material is pumped by said pump and a laser beam of sufficient power is reached.

2. The laser as set forth in claim 1 further including an iris diaphragm in said starter cavity.

* * * * *